May 19, 1970   A. LA ROCK, JR   3,512,802
TRACTOR RIG

Filed March 7, 1968   2 Sheets-Sheet 1

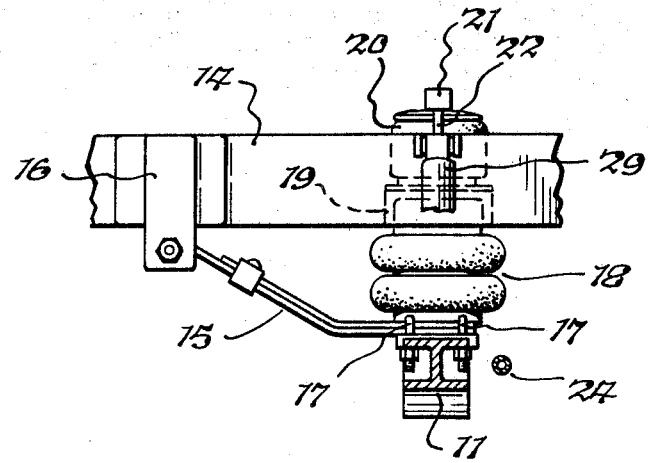
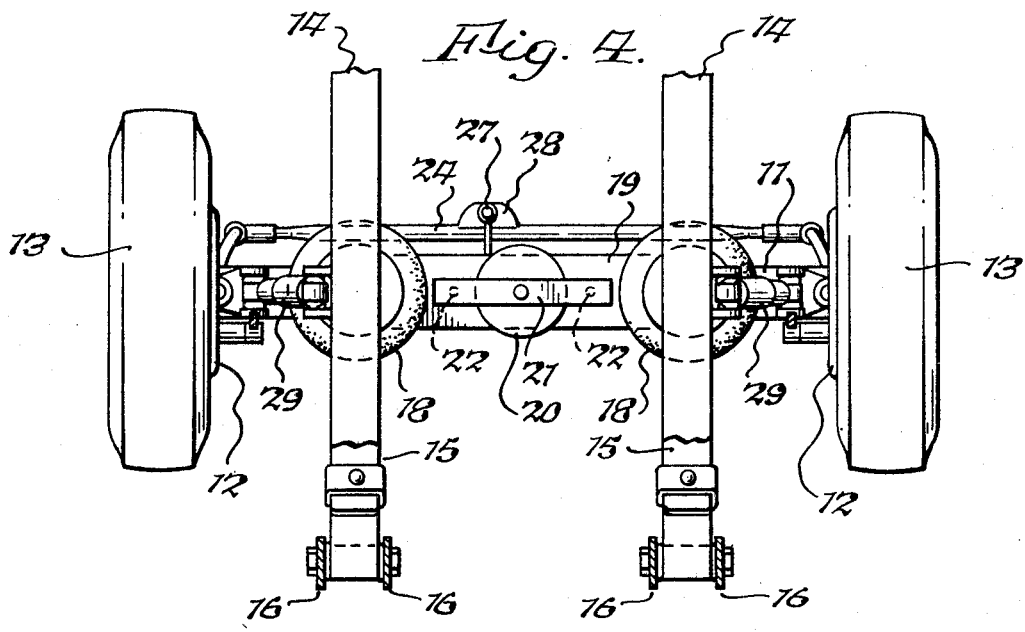
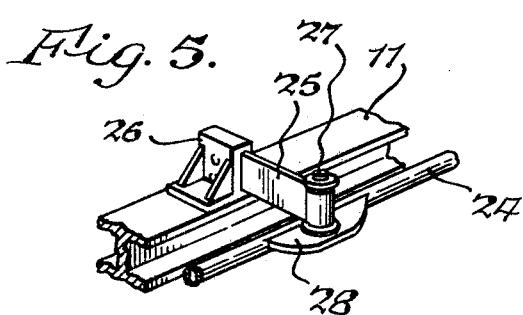
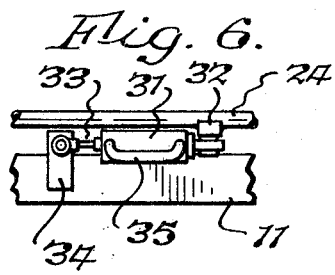

United States Patent Office 3,512,802
Patented May 19, 1970

3,512,802
TRACTOR RIG
Arthur La Rock, Jr., 109 Hudson St.,
South Glens Falls, N.Y. 12801
Filed Mar. 7, 1968, Ser. No. 711,325
Int. Cl. B60j 1/00
U.S. Cl. 280—405                                4 Claims

ABSTRACT OF THE DISCLOSURE

This invention is directed to a single drive axle tractor provided with a pair of adjustable-load, self-steering pusher wheels mounted on a drop center axle positioned ahead of the single drive axle.

THE INVENTION

This invention relates generally to tractor-trailer units having auxiliary wheels that can be moved into and out of load bearing positions and particularly seeks to provide a novel single drive axle tractor provided with a pair of adjustable load, self-steering, pusher wheels mounted on a drop center axle positioned ahead of the single drive axle.

It is broadly old to provide trucks and tractors with auxiliary tag wheels, i.e., positioned behind the drive axle. It is also broadly old to provide trailers with auxiliary wheels.

However, a tractor provided with auxiliary self-steering pusher wheels offers many advantages over prior types of auxiliary wheels.

One advantage of this invention lies in the ability to use a single drive axle tractor to legally carry more payload more economically.

Other advantages of this invention include; a weight saving over twin drive axle tractors of from 2,000 to 3,000 pounds, thus permitting an additional payload per trip; a reduction in parasitic horsepower requirements, thus resulting in more usable road horsepower to propel the vehicle; an increase in fuel economy; lower tire costs; lower maintenance costs due to the elimination of one drive axle, power divider and short drive shaft normally required in a twin drive axle tractor; better handling in turns and on slippery roads, and elimination of tire scuffing due to the self-steering feature of the pusher axle; good traction on slippery roads because the pusher axle can be lifted or lightened to put more weight on the front axle for better steering traction and more weight on the rear axle for more driving traction since the fifth wheel is positioned ahead of the drive axle; a better ride, either when empty or when loaded, since when empty the pusher axle is lifted and when loaded the drive axle and the pusher axle are each independent of the other; and a reduction in driver fatigue due to smoother ride and easier steering.

Therefore, an object of this invention is to provide a single drive axle tractor with a novel pusher axle assembly.

Another object of this invention is to provide a tractor of the character stated in which the wheels of the pusher axle assembly are self-steering.

Another object of this invention is to provide a tractor of the character stated that includes a rigid drop center axle that may be bodily raised and lowered to move the wheels carried thereby from or into contact with the road surface.

Another object of this invention is to provide a tractor of the character stated in which means are provided to adjustably vary the load supported by the pusher axle assembly when the wheels thereof are in contact with the road surface.

A further object of this invention is to provide a tractor of the character stated in which means are provided to make the wheels of the pusher axle assembly thereof self-centering.

A further object of this invention is to provide a tractor of the character stated in which the fifth wheel thereof is positioned ahead of the drive axle whereby to better distribute the load on the driven and pusher wheels when the pusher wheels are in operation and to apply a relatively heavier load to the front axle and drive axle when the pusher wheels have been lifted out of contact with the road surface.

With these and other objects, the nature of which will be apparent, the invention will be more fully understood by reference to the drawings, the accompanying detailed description and the appended claims.

In the drawings:

FIG. 3 is a fragmentary longitudinal section taken along line 3—3 of FIG. 2 and shows the general arrangement for one of the two axle-steadying springs;

FIG. 4 is a fragmentary top plan of the installed pusher axle assembly;

FIG. 5 is a fragmentary perspective showing the centering spring connection between the pusher axle and its associated tie rod; and FIG. 6 is a fragmentary top plan view showing the installation of a double acting hydraulic cylinder between the axle and the tie rod.

Figure 1:
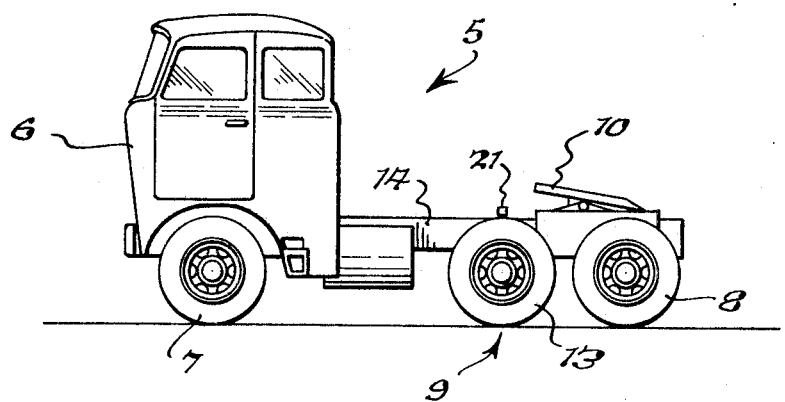
FIG. 1 is a somewhat schematic side elevation of a tractor provided with a pusher axle assembly constructed in accordance with this invention.

Referring to the drawings in detail, the invention as illustrated is embodied in a tractor unit generally indicated 5 having an engine and cab 6, standard front wheels 7, rear wheels 8 driven from a single drive axle (not shown), an auxiliary self-steering pusher wheel assembly generally indicated 9 and a fifth wheel 10 mounted on top of the tractor frame ahead of the drive wheels 8.

Figure 2:
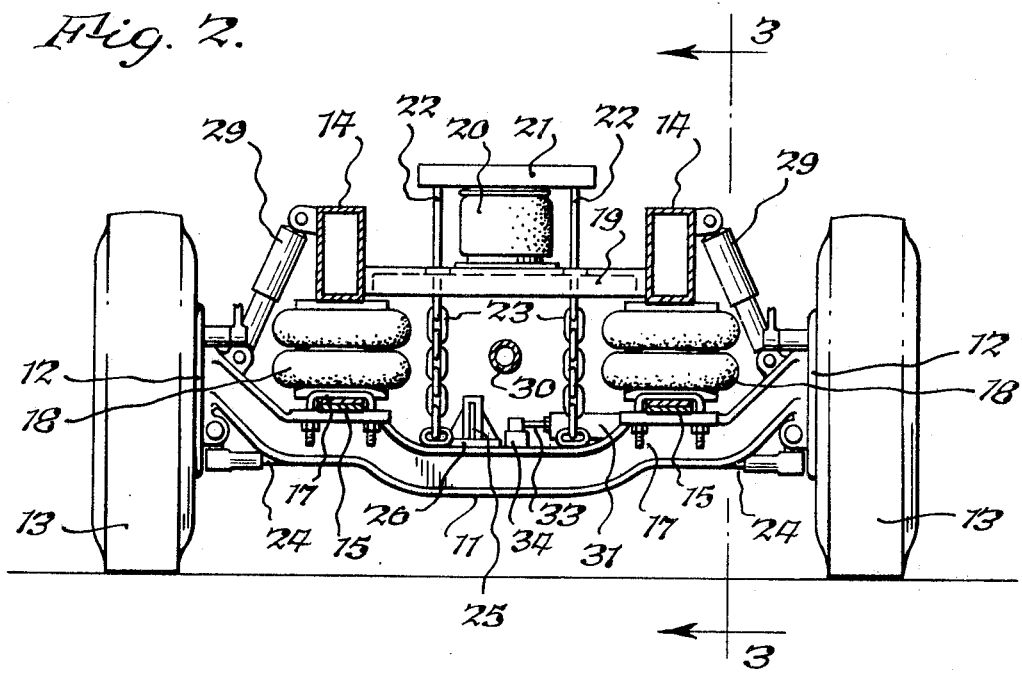
FIG. 2 is a somewhat schematic transverse section taken along line 2—2 of FIG. 1 and shows the general arrangement of the pusher axle assembly.

In accordance with this invention, a drop center type of front axle 11 fitted with the usual brakes 12 and wheels 13, is mounted beneath parallel main frame members 14, 14 (see FIGS. 2 and 3 of the drawings) ahead of the drive axle and is held in position by two torque springs 15, 15. The front end of each spring 15 is fastened to a bracket 16 rigidly affixed to and depending from an associated frame member 14; and the rear end thereof is clamped to the top of the axle 11 as by a pair of spaced U-bolts 17, 17.

A pair of doughnut type air bags 18, 18 are interposed between the bottoms of the frame members 14 and the axle 11 to apply weight to the pusher axle 11.

A transverse girder 19 is rigidly affixed to the frame members 14 and is positioned directly over the pusher axle 11. The bottom of a centrally positioned pedestal type air bag 20 is carried by the girder 19 and is provided at its top with a strongback 21. A pair of lift rods 22, 22 have their upper ends connected to the ends of the strongback 21, and their lower ends extend through suitable holes in the girder 19 for connection to the upper ends of a pair of lift chains 23, 23, the lower ends of which are affixed to the pusher axle 11.

Both the lifting of the pusher axle through operation of the air bag 20 and the application of weight to the pusher axle through operation of the air bags 18 are controlled by a single valve (not shown) in the tractor cab. A pressure regulator should be provided in the air system to prevent the operator from overloading the pusher axle.

The wheels 13 are connected by a tie rod 24. The wheels and axle are adjusted for the proper caster, camber and toe-in so that they are self-steering when in use. A centering device is provided (see FIG. 5 of the drawings) and consists of a leaf spring 25 having its front end rigidly attached to a bracket 26 affixed to the pusher axle 11 and its rear end pin-connected as at 27 to a rearwardly extending lug 28 affixed to the tie rod 24.

Shock absorbers 29, 29 extend between the ends of the pusher axle 11 and the frame members 14.

A drop center type of pusher axle is used in order to provide clearance beneath the drive shaft 30.

Although the leaf spring 25 serves adequately to center the wheels, it is too flexible to dampen sudden lateral movements of the tie rod whenever the wheels 13 contact bumps, holes or other road surface irregularities. This damping function is performed by a double acting hydraulic cylinder 31 (see FIG. 6) having one end pivotally connected to a lug 32 on the tie rod 24 and its piston rod 33 pivotally connected to a lug 34 on the axle 11. The end chambers of the cylinder 31 are connected by a small diameter pipe 35 so that the piston of the cylinder, which is centered in the cylinder when the wheels are centered, is permitted to move back and forth slowly as in turns but is prevented from moving suddenly.

Although it is to be expected that a new tractor having a pusher axle assembly constructed in accordance with this invention would have a wheel base sufficiently long to accommodate same, it is pointed out that a fully operational prototype was constructed by lengthening the frame of 1960 B 61 "Mack" tractor to increase the wheel base from 146½" to 170", repositioning the drive axle, lengthening the drive shaft, positioning the fifth wheel ahead of the drive axle and adding the pusher axle assembly on a center 50" ahead of the drive axle center.

A load of 9,000 to 10,000 pounds on the pusher axle allows a legal weight of up to 32,000 pounds on the rear of the tractor; and the lighter weight of this tractor, compared to that of a typical twin drive axle unit, allows an additional payload of up to 400 gallons per trip for tank trailers, or the equivalent for other trailers.

Fuel economy is also obtained. The above-mentioned prototype, with a still tight, newly rebuilt 711 engine, hauled a 6,700 gallon load of No. 6 fuel oil (gross vehicle weight 72,800 pounds) 578.5 miles on 79.6 gallons of fuel for an average of 7.27 m.p.g.

The tractor of this invention also provides better handling in turns and around corners because the pusher axle is self-steering and the tractor does not have a tendency to continue straight ahead when a turn is attempted, as is the case with a twin drive or tag axle tractor. Furthermore, under slippery road conditions the pusher axle can be lightened or lifted from the road to put more weight on the front axle for better steering traction and on the rear axle for more driving traction, because the load on the fifth wheel is ahead of the drive axle.

Although a preferred embodiment of this invention has been described as installed on a single drive axle tractor, it will be understood that the principle of providing self-steering auxiliary wheels is also applicable to trailers where the auxiliary wheels would be positioned ahead of the dual rear wheels thereof.

It is of course to be understood that variations in arrangement and proportions of parts may be made.

I claim:

1. In a tractor wherein is provided a frame, an engine mounted on said frame, a front axle provided with steerable wheels, a rear drive axle provided with driven wheels operably connected to said engine, and a fifth wheel mounted on said frame ahead of said rear drive axle, the combination of; a drop center pusher axle mounted ahead of said rear drive axle with proper caster to render idler wheels rotatably mounted thereon self steering when in contact with the ground and including a pair of wheel spindles pivotally mounted on king pins affixed thereto, steering knuckles for changing the angular position of said wheel spindles, and a tie rod connecting said steering knuckles, a pair of idler wheels rotatably mounted on said wheel spindles, means for bodily raising and lowering said pusher axle, means for applying an adjustable load to said pusher axle when the wheels carried thereby are incontact with the ground, and means for restraining said pusher axle against displacement other than vertical.

2. The tractor of claim 1 additionally including means for centering the self-steering wheels carried thereby.

3. The tractor of claim 2 in which said axle raising and load applying means comprise operator-controlled air bags.

4. The tractor of claim 2 in which shock absorbers are interposed between said frame and the ends of said pusher axle.

References Cited

UNITED STATES PATENTS

| | | | |
|---|---|---|---|
| 1,267,289 | 5/1918 | Tracy | 280—94 |
| 2,277,197 | 3/1942 | Ash | 280—90 X |
| 2,731,276 | 1/1956 | Cross | 280—81 |
| 3,093,388 | 6/1963 | Kulyk | 280—405 X |
| 3,197,237 | 7/1965 | Smith | 280—405 X |
| 3,227,470 | 1/1966 | Funk | 280—405 |
| 3,257,124 | 6/1966 | Mendez | 280—405 |
| 3,291,503 | 12/1966 | De Lay | 280—81 |
| 3,325,181 | 6/1967 | Granning | 280—43.23 |

BENJAMIN HERSH, Primary Examiner

JOHN A. PEKAR, Assistant Examiner

U.S. Cl. X.R.

280—415